United States Patent
Hundley et al.

(10) Patent No.: US 11,852,101 B1
(45) Date of Patent: Dec. 26, 2023

(54) MODULATING INTERNAL BALLISTICS IN A 3D-PRINTED ROCKET MOTOR AND AN ADDITIVE MANUFACTURING PROCESS

(71) Applicant: X-Bow Launch Systems Inc., Albuquerque, NM (US)

(72) Inventors: Jason Hundley, Albuquerque, NM (US); Mark Kaufman, Auburn, CA (US); Michael McPherson, Socorro, NM (US)

(73) Assignee: X-Bow Launch Systems Inc., Albuquerque, NM (US)

( * ) Notice: Subject to any disclaimer, the term of this patent is extended or adjusted under 35 U.S.C. 154(b) by 133 days.

(21) Appl. No.: 17/325,524

(22) Filed: May 20, 2021

Related U.S. Application Data

(60) Provisional application No. 63/049,056, filed on Jul. 7, 2020, provisional application No. 63/027,887, filed on May 20, 2020.

(51) Int. Cl.
| | | |
|---|---|---|
| *F02K 9/24* | (2006.01) | |
| *F02K 9/10* | (2006.01) | |
| *B33Y 80/00* | (2015.01) | |
| *B33Y 10/00* | (2015.01) | |

(52) U.S. Cl.
CPC ............... *F02K 9/24* (2013.01); *B33Y 10/00* (2014.12); *B33Y 80/00* (2014.12); *F02K 9/10* (2013.01); *F05D 2220/80* (2013.01); *F05D 2230/30* (2013.01)

(58) Field of Classification Search
CPC ..... F02K 9/24; F02K 9/10; F02K 9/14; B33Y 80/00; F05D 2230/30; F05D 2230/31
See application file for complete search history.

(56) References Cited

U.S. PATENT DOCUMENTS

| | | | |
|---|---|---|---|
| 8,234,082 B1 * | 7/2012 | Bridge | G01M 5/0033 |
| | | | 702/42 |
| 9,233,883 B1 * | 1/2016 | Rauscher | C06B 23/005 |
| 9,453,479 B1 * | 9/2016 | Jones | F02K 9/08 |
| 10,501,385 B1 * | 12/2019 | Buckner | F02K 9/08 |
| 2005/0120703 A1 * | 6/2005 | Rohrbaugh | F02K 9/28 |
| | | | 60/229 |
| 2020/0048158 A1 * | 2/2020 | Wallace | C06B 45/02 |

* cited by examiner

*Primary Examiner* — Andrew H Nguyen
(74) *Attorney, Agent, or Firm* — Mathew J. Temmerman; Temmerman Law

(57) ABSTRACT

A method of making a multi-grained fuel grain for a rocket is disclosed, the method comprising the steps of using at least one nozzle to extrude a first propellant in an additive manufacturing process, the first propellant comprising a multi-grained fuel grain, the multi-grained fuel grain forming the at least one void, the at least one void facilitating variation in internal ballistics, forming sensors, said sensors permitting continuous monitoring and continuous modification such that a user controls the ballistics profile of a rocket motor, forming an electrically-controlled second propellant in contact with and operatively coupled to the sensors; and wherein the additive manufacturing process uses at least at least one nozzle to extrude raw materials.

8 Claims, 2 Drawing Sheets

MODULATING INTERNAL BALLISTICS IN A 3D-PRINTED ROCKET MOTOR AND AN ADDITIVE MANUFACTURING PROCESS

RELATED APPLICATIONS

This application claims priority from the United States provisional application with Ser. No. 63/027,887, which was filed on May 20, 2020, and from the United States provisional application with Ser. No. 63/049,056, which was filed on Jul. 7, 2020. The disclosure of each provisional application is incorporated herein as if set out in full.

STATEMENT REGARDING FEDERALL SPONSORED RESEARCH OF DEVELOPMENT

Portions of the invention described herein were made in the invention was made under a contract with an agency of the United States Government. The name of the U.S. Government agency and Government contract number are: US ARMY ACC-APG-RTP W911NF, Contract no. W911NF19C. The government may have certain rights in the inventions disclosed herein.

TECHNICAL FIELD

The present invention relates to automated fabrication systems, 3 D-printable propulsion technologies, solid propellant materials, and methods of producing propellant elements. Specifically, the present invention relates to a method of production of a fuel grain for a solid rocket motor and/or hybrid rocket motor having a fuel grain chamber and geometric shape that induces the flux of oxidizer as it passes through the fuel grain chamber. This invention is not solely limited by fuel grains or hybrid designs, having equally valid use for composite propellant formulations and ensuing solid rocket motors (SRM) with energetic propellant fill comprised of both fuels and oxidizers in an appropriately prepared slurry, subsequently cured or hardened. In both cases, the fuel grain or composite propellant SRM is manufactured via an additive or 3 D-printed technique from continuous or semi-continuous feed and mix of ingredients by expedient methods, then expelled into predetermined configurations suitable for rocket propulsion.

BACKGROUND

The 3D-printed rocket motors/engines and gas generators described herein generally encompass propulsion technologies utilizing a pressurized oxidizer stored in a liquid or gaseous state, and a solid fuel. The manufacture of SRMs with blended fuel and oxidizer ingredients are not significantly different in means or methods from hybrid systems having oxidizer(s) separate from printed fuel structures. Prior art systems include both hybrid rocket engines (HRE), liquid rocket engines (LRE), and solid rocket engines (SRE). Reverse hybrid engines (RHE), where the oxidizer is stored in a solid state have also been described, but are much less common. The below background will focus on HREs and composite propellant SRMs due to their expanding relevance in addition to their many distinct advantages over purely liquid systems, including overall simplicity, safety, improved operability, performance, and cost. In addition, the concepts described covering prior art HRE or SRM systems are broadly applicable, often encompassing SREs, LREs, RHES, and other related systems, including the aforementioned composite propellant solid rocket motors The advent of additive manufacturing technology has enabled new methods of designing and manufacturing rocket fuels with much more complex geometries. Using additive manufacturing, for example, solid composite propellant or fuel structures can be designed and printed to include complex chamber geometries that were previously too difficult or impossible to achieve with traditional casting methods. Recent publications demonstrate the use of complex chambers geometries resulting in significant performance increases.

There are several types of additive manufacturing processes that can be used to manufacture fuels. A few common processes include Fused Deposition Modeling (FDM), Selective Laser Sintering (SLS), Stereolithography (SLA, and Laser Spray Modeling (LSM). Relatedly, a laser spray nozzle assembly is described in U.S. Pat. No. 4,724,299. This assembly includes a nozzle body, a housing, a cladding powder passage, and a cladding powder supply system that is operably associated with the passage such that the powder exits the opening coaxial with a laser beam. Notably, while FDM, SLS, SLA, and LSM processes represent some of the most common and most inexpensive forms of additive manufacturing, in many cases these processes provide for inferior material densities, limited scaling capabilities, poor repair capabilities, mechanical joint limitations, and/or machinability issues.

Prior art methods and processes are further known to produce excessive fabrication waste, require excessive labor, expend excessive energy and, in general, suffer from diminished production efficiencies. Prior art fabrication and manufacturing methods also typically alter the coefficient of thermal expansion, thereby introducing heterogeneity into thermal expansion rates, causing stress fractures, cracks and material fatigue such as bending or bowing. Further, there is a need for optimizing contact surface areas in order to maximize thermal energy transfer, reduce material requirements and thereby also reduce weight requirements. Finally, there is a need for 3 D fabrication with capabilities of the highest thermal effectiveness, highest temperature allowances, highest pressure allowances, highest compactness, highest erosion resistance, and highest corrosion resistance. In SRMs requiring optimized performance for specific rocket propulsion missions, energetic propellant slurry ingredients, whether fuels, oxidizers, binding resins, curatives, or ballistic modifiers, generally are not known to be adaptable to, or compatible with, conventional 3 D printing or additive manufacturing resins, thermoplastics, or thermosets. Instead, an unanswered need exists to 3 D print or additively manufacture a tailored ingredients set that is emplaced into SRM chambers and cases that meet stringent requirements of ballistics, mechanical integrity, storage life, having acceptable hazards for transport and use in multi-varied propulsion duties.

Prior Art Fuel Chamber Designs

Recent studies have investigated a variety of performance enhancing geometries and have demonstrated significant increases in regression rates compared to simple straight chamber geometries. Each of said geometries utilize a different technique to manipulate the oxidizer flux. A first prior art example, conducted in 2014 at Pennsylvania State University (PSU), concerns a composite fuel system utilizing a printed acrylonitrile butadiene styrene (ABS) tabulator structure cast with paraffin (See, Armold et. al., *Formulation and characterization of paraffin-based solid fuels containing swirl inducing grain geometry and/or energetic additives,*

2014). Regression rates for the turbulator were measured using conventional methods. In this case, the added turbulator was shown to increase regression rates by an average of 35%, although a small sample size of testing was performed.

In a related publication, star swirl fuel chamber designs using an acrylic fuel and gaseous oxygen were employed, achieving regression rates of an average of 250% greater over the standard cylindrical straight chamber design (Id.). This effect was seen to increase with each turn per inch for each swirl design tested.

Additional star swirl chambers are known in the art that utilize ABS and N2O. The related publications describe notable increases in regression rates over straight chambers for similar oxidizer mass fluxes. Further, these publications demonstrate a potential regression rate increase of up to 67% for the star swirl over straight chamber designs (See, B. R. McKnight et al., *Advanced hybrid rocket motor propulsion unit for CubeSats*, 2015). However, this study was also shown to slightly decrease the combustion efficiency by as much as 15% for some tests.

Relatedly, in 2012 Utah State University (USU) conducted a study investigating the performance of a helical swirl design (See, A. Bath et. al., *Performance characterization of complex fuel chamber geometries for hybrid rocket fuel grains*, 2012). The motivation was to enable larger fuel surface burning area without increasing the length of the fuel grain. The helical fuels were printed in ABS and the oxidizer was N2O. The helical swirl design increased regression rates by up to 130% when compared with straight chamber fuels at the same oxidizer flux. For post burn regression analysis, USU first sectioned the fuel, then the cross sections were imaged to recreate a computerized mesh of the burned grain. The average radius was then calculated to obtain the average regression rate for the burn.

Conventional cast manufactured hybrids have made use of performance enhancing additives in their formulations. These additives can increase regression rates through enhanced radiation, enhanced heat transfer, as well as increased density. One prior art system has shown that the regression rate of HTPB with GOX oxidizer can be increased by the inclusion of 5% (by weight) 100 nm sized aluminum particles (See, J.C. Thomas et. al., *Hybrid rocket enhancement by micro- and nano-scale additives in HTPB fuel grain*, 2015).

This effort was led by the Jet Propulsion Laboratory in collaboration with the Aerospace Corporation and Texas A&M University. In particular, Thomas et. al. notes that particle size is a key factor in performance enhancement. Micron sized particles increase regression rates by enhancing the radiation heat flux from the combustion flame to the fuel surface. Nano-scale aluminum particles additionally have lower ignition temperatures and higher specific area, releasing energy closer to the surface.

Relatedly, Hassan et. al. showed that the use of Lithium aluminum hydride (LiAlH4, LAH) and Magnesium hydride (MgH2, MGH) nanoparticles significantly increased the regression rate of a paraffin-based fuel used with a gaseous oxygen oxidizer (See, A. Hassan, *Characterization of paraffin-based hybrid rocket fuels loaded with nanoadditives*, 2018). Further, Leoni and Vadala showed an increase in performance using a mixture comprised of pure HTPB with a 10% Al-Cu powder composition (See, P. Leoni and G. Vadala, *Innovative metallized nano-sized additives for hybrid rocket propulsion*, 2012). This publication demonstrated an increase in regression rate of up to 37% compared to the standard HTPB fuel.

Prior Art Fuel Grain Structures

Additive manufacturing of hybrid fuels has also enabled the design of hollow grain structures which can then be filled with another fuel. The printed structure can be designed as a matrix that releases pockets of the supplemental fuel. The secondary, tertiary, and quaternary fuels may have increased performance properties and their use is enabled by the printed grain structure. In addition, thrust profiles can be improved by custom tailoring fuel formulations such that the fuels burn through various sections of varying energy densities.

Lyne et. al. showed that a printed grain matrix structure may be filled with powdered fuels such as coal, graphite and/or aluminum (See, J.E. Lyne, *The use of a 3-D printed, polymer matrix containing pulverized fuel in a hybrid rocket*, 2018). The completed fuel may be roughly 50% ABS and 50% powdered fuel by volume. Voids may be optimized to achieve maximum powdered fuel mass while ensuring the ABS structure does not prematurely collapse. This publication described meaningful increases in thrust levels in addition to novel 3 D-printable components. Relatedly, The Aerospace Corporation described a related technique which utilizes a printed grain structure that releases liquid fuel rather than powdered fuel (See, *Aerospace annual rechamber: Creating an agile space enterprise*, 2018). This technique has been stated to potentially increase regression rates by up to 100%.

Additional techniques for achieving performance increases have also been explored. These include using a swirl injector and mixing additives injected into the cast fuel. Some work has also been done exploring the effect of compounding these techniques along with complex fuel chambers. In some cases, this has led to additional performance increases in regression rates. For example, the turbulator grain design can be combined with a paraffin/aluminum fill mixture, in addition to a swirl oxidizer injector, in order to increase regression rates.

Prior Art Composite Propellant SRM Structures

Additive manufacturing of SRMs using slurries of particulate fuel/oxidizer in a liquid resin curable binder is not readily shown or demonstrated even by those well practiced in the science of energetic propellant production, although the prior art of composite propellant thermoset mix/cast/cure is a well-understood aspect of SRM manufacture. The additive manufacturing of SRMs benefits from continuous or semi-continuous feed of propellant slurries from start to finish in the motor 3 D printing operation, bound by the slurry characteristics of viscosity, cure rates of the slurry, yield stress, motor size, and other solid/liquid interactions in the composite. Batch mixing of composite slurries may be performed offering a semi-continuous production of SRMs via the additive manufacturing technique, but continuous mixing of the separate ingredients in composite propellant slurries allows control of ballistics, cure properties, and other desirable attributes for SRMs that can be adjusted by design throughout the motor printing process, either within one motor or across multiple motors made while continuously controlling rate and placement of the propellant, in molds having near net shape inserted into motor cases, or into the motor case itself. This novel flexibility and adaptability for SRM production not only enhances automation and thereby reduces cost, but also enables unique motor performance during its mission that is not producible using conventional cast/cure techniques.

Prior Art 3 D Printing and Testing Capabilities

Additive manufacturing, or 3 D printing, refers to a variety of different processes. The most common method of additive manufacturing for printing complex fuel chambers in recent studies has been fused deposition modeling (FDM). In the FDM process, the fuel is printed layer by layer. In the FDM process, a roll of polymeric filament is continuously fed through a hot end, which melts the material and bonds the material to the previous layer. Once a layer is completed, the extruder raises to complete the next layer. This process repeats for each layer until the final layer is completed.

Advantages of FDM include low cost, ease of use and the availability of open source hardware and software. Ideal FDM printers are capable of printing very fine structures, for example, ABS fuel filaments. ABS has a high print temperature of 240 degrees Celsius, and requires a controlled thermal environment to prevent warping. In addition, heated beds are necessary to ensure that the ABS will adhere to the build plate, and maintain sufficient temperature to prevent premature cooling and warping.

In one example, the MakerBot 3 D printer from Johnson and Johnson 3 D Printing Laboratory may be used, but it does not contain heated beds and is limited to printing PLA filament. Therefore, a dedicated 3 D printer for producing ABS fuels is often preferable. For example, a Creality Ender 3 with a glass heated bed is known in the art to print the ABS fuels and ABS-type fuels with high efficiency.

Indeed, in recent years additive manufacturing (AM) has been implemented in the printing of inert rocket components using the above components, and the like. AM has enabled design of fuel grains with complex chamber geometries which are not possible or very difficult to achieve through conventional casting techniques. These geometries can be used to manipulate the oxidizer flux and interactions with the fuel to increase performance of the engine. Indeed, some recent studies using a variety of performance enhancing geometries have shown significant regression rate increases. Prior art examples include but are not limited to hot-fire experiments of printed fuels in addition to additive manufacturing techniques for ABS+Aluminum complex chamber fuels grain, the later resulting in successful tests for a 3 D printed ABS+Aluminum hybrid rocket fuel grain.

Although recent developments in additive manufacturing are promising, as described above there are many geometries and configurations that remain unexplored. Performance enhancing mechanisms are largely unknown or under development, and much exploration will be required to perfect fuel grain designs, demonstrate reliability, and explore potential new geometries.

For the foregoing reasons there is a need for additively printed complex rocket and gas generator components. As discussed, there is a need for custom tailored fuel chambers and fuel formulations such that when a solid rocket motor burns through its fuel, it burns through various sections of the fuel, which might be of varying energy densities. For the above reasons, there is also a broad need in the art for small gas generators and small diameter rockets (for example, up to 5 inch-60 inch diameter rockets) that are produced in an increasingly efficient and environmentally friendly manner.

The adaptability of continuously varied and controlled composite propellant formulations that are selectively emplaced as novel and unique grain designs, tailored for burn rate and/or mechanical properties, and automated in a 3 D printed mode of production, significantly enhances the state of the art. Especially when the continuous mix of separate fuel/oxidizer/binder ingredients are expressed and emplaced via robotic control, the ensuing SRM becomes a product with heightened quality and enhanced performance, for the thrust vs time characteristics can be controlled, or continuously modified, for each and every motor print operation from start to finish.

SUMMARY

The present invention may be used as a rocket motor, a system for generating combustion gases, a system for propelling a munition, and the like. This system may be used to propel numerous objects, including but not limited to projectiles, missiles, bombs, supply containers, small satellites, and research stations. Notably, the present invention provides many advantages, including the ability to construct a device with multiple components in a single integrated manufacturing process that is continuously monitored or adjusted. Furthermore, a wide variety of propellant viscosities and fuel grain geometries are contemplated relative to conventional systems. Importantly, the present invention permits a user to extrude both sensors and propellants together in a single continuously monitored, continuously modifiable additive process.

In summary, the present invention includes a method of making a fuel grain such as a multi-grained fuel grain for a rocket, the method requiring in an additive manufacturing process (also referred to as "3 D-printing" herein). This process uses at least one nozzle to form a multi-grained fuel grain that is composed of at least one propellant and a void that permits a user to program internal ballistics in a stepwise and/or continuous fashion. Further, sensors may be formed during this process, the sensors permitting continuous monitoring and continuous modification during the additive manufacturing process such that a user may control the ballistics profile of the rocket motor. Sensors may permit, for example, a user to remotely control the thrust and burning rate of a rocket motor in both a stepwise and continuous fashion, and also to indicate suitability of use over time of extended storage, a "health monitoring" system built into the SRM at time of production that allows nondestructive evaluation at any time. In other embodiments, electrically-controlled propellants come in contact with and operatively couple to the sensors. In the preferred embodiment, the additive manufacturing process uses at least at least one nozzle to extrude raw materials as either a hybrid or fuel grain, or as a composite mixture of fuels and oxidizers, as particulates, suspended in a liquid binder as a printable slurry and post-cured to appropriate mechanical integrity.

In other embodiments, the additive manufacturing process includes forming an inert shell around the rocket body, sensors and the electrically-controlled solid propellant material. In some embodiments, the at least one nozzle is contained within a print head, wherein control algorithms are used to control the at least one nozzle in order to achieve desired deposition volumes and fuel grain forms. In other embodiments, forming the electrically-controlled second propellant material comprises forming the electrically-controlled second propellant material between adjacent pairs of sensors. In other embodiments, forming the sensors includes forming multiple adjacent pairs of sensors.

In some embodiments, sensors are embedded into the fuel grain in order to facilitate continuous monitoring of the additive manufacturing process, the fuel grain including a plurality of layers of fuel grain material. Further, in some embodiments the sensors are embedded into the fuel grain in order to facilitate continuous modification of the additive manufacturing process. In some embodiments, at least one nozzle is contained within at least one print head. Notably, the at least one nozzle is adapted to extrude high viscosity fuels in the preferred embodiment. Notably, the electrically-controlled propellant materials may include extruding electrically-controlled solid propellant materials such as an electrically-conductive fill in a polymer.

In some embodiments, a unique method of operating a rocket permits modulation of the total impulse achieved. Said method of operation acts on a rocket with a rocket body wherein said rocket body comprises a cylindrical shell housing annular sections, said annular sections having spaces between said annular sections, wherein said spaces are filled with an electrically-operated propellant. Notably, the 3 D-printing of the associated rocket is monitored and modified in real-time via control algorithms that are used to control 3 D-printing to achieve desired deposition volumes. Said control algorithms include software and hardware systems in order to, in part, control the supply of high-viscosity raw materials during 3 D-printing. This method is further adapted to produce a pre-ignition section and a post-ignition section, said post-ignition section disposed at the end of the rocket body opposing the payload section.

In addition, in some embodiments a propulsion system for a rocket is disclosed including rocket combustion components. Said propulsion system includes a fuel grain forming a fuel grain section, the fuel grain section contained in the rocket body. This fuel grain section may have a generally cylindrical shape defining a center chamber. This propulsion system also includes a rocket body with annular sections, wherein said annular sections may be embedded with sensors.

In some embodiments, the present invention contemplates rocket combustion components such as an oxidizer, a rocket fuel, and a binder. Further, rocket fuel may include metal-based or non-metal based fuel. In addition, the center chamber may include unique patterns designed to induce oxidizer vortex flux persisting throughout the rocket's operation.

It is a first objective of the present invention to produce a novel means for a user to vary the internal ballistics of rockets, missiles, projectiles, small satellites, and the like during flight.

It is another objective of the invention to provide a sustainable means of producing a 3 D-printable multi-grained fuel grain capable of embedding a variety of materials such as propellants, catalysts, and binders.

It is another objective of the invention to provide a means to vary the flux of incendiary fluids during use of a 3 D-printed rocket.

It is another objective of the invention to enable embedded sensors to be integrated into said fuel grains to facilitate continuous modification during additive processing.

These and other advantages and features of the present invention are described with specificity so as to make the present invention understandable to one of ordinary skill in the art.

DETAILED DESCRIPTION OF THE INVENTION

The present invention is directed towards solid and hybrid-fueled rocket motors, solid fuel grains 100, and methods of production for a rocket engine. In some embodiments additive manufacturing is utilized to construct a novel solid and/or hybrid rocket propellant grain structure. The present invention also comprises methods for using said grains in the operation of a hybrid and/or solid-fueled rocket engine. Notably, these processes are distinct from generalized spraying, wherein insulation is sprayed directly onto rockets. In additional embodiments, additive manufacturing may be utilized to embed an ignition structure or formulation characteristic in order to enhance flame spreading upon ignition on the propellant surface within the rocket motor.

Regarding fuel grains 100, in some embodiments a solid fuel grain may be manufactured by various means including a deposition type additive manufacturing apparatus. In the preferred embodiment, the disclosed method of production includes a building platform capable of moving in multi-axis XYZ directions, controlled by step motors. Said step motors are used to modulate the three-dimensional construction of the rocket motor, the rate of fuel grain deposition, and other factors.

Further to the above, the present system is used for printing or otherwise additively manufacturing a solid rocket motor and related rocket motors incorporating solid rocket motor components. As described above, the device is additively manufactured layer by layer on a platform or bed and, in the preferred embodiment, benefits from continuous modification or monitoring. The device includes a propellant or gas-producing energetic material or propellant material processed via continuous modification, sensors that are operatively coupled to the energetic material, and a shell 104 encapsulating the energetic material, sensors, and the like.

Figure 1A:
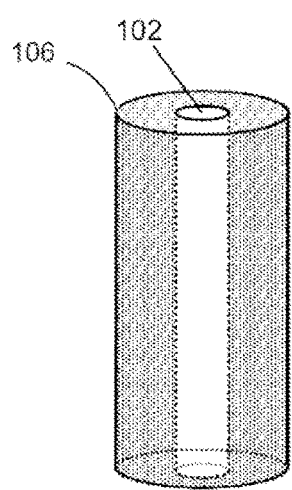
FIG. 1A depicts a fuel grain section with a generally cylindrical shape including a center chamber according to an embodiment of the invention.
Figure 2A:
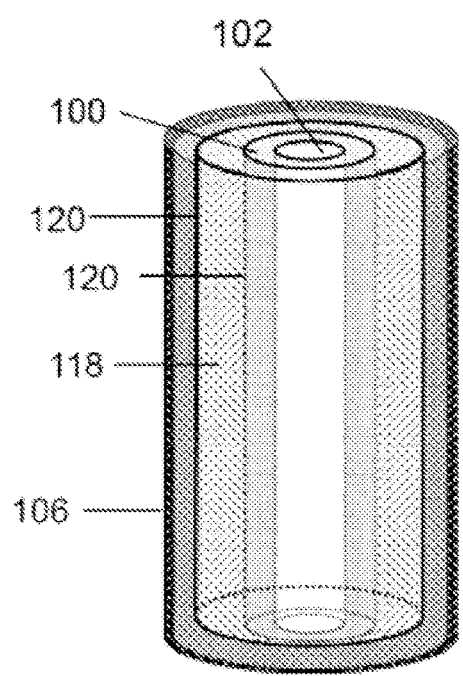
FIG. 2A depicts a detailed fuel grain section with a generally cylindrical shape including the shell, center chamber, and annular sections and other elements according to an embodiment of the invention.

Additional details of fuel grains, including their fabrication, are described and claimed below. Preferably, as shown in FIG. 1A and FIG. 2A, the fuel grain section has a generally cylindrical shape and defines a center chamber 102. In the preferred embodiment, the center chamber 102 has a substantially circular cross-section, but the center chamber 102 may have other geometries such as a star or polygon, without departing from the scope of the present invention. Notably, in some embodiments the fuel grain section may include a solid propellant and a solid fuel about said solid propellant.

In the preferred embodiment, the herein contemplated invention comprises nozzles 103, said nozzles 103 generally contained within a print head(s). Multiple print heads are contemplated, one to tailor the inert composition and the other to be focused on the energetic itself. The nozzles 103 are used for extruding or otherwise depositing material for the components of the device. Raw materials for the components may be stored in reservoirs that are operatively coupled to supply materials to the respective nozzles 103. Notably, in some embodiments, the nozzles 103 and print heads are adapted to extrude high viscosity fuels or composite slurries, in addition to controlled cure-rate thermosets to allow maximum grain design flexibility and optimized throughput.

In some embodiments, the nozzles 103 may have different configurations, and may require different treatments of their respective materials. Further, the print heads are adaptable for use with various nozzle diameters and/or nozzle flow feed mechanisms (such as different rates of feeding raw material) in order to extrude different materials layer by layer. In other embodiments, the present invention is configured to handle materials of heterogenous viscosity. Further, processing speeds are modifiable on-demand and the present invention is generally adapted for use with a wide range of operable speeds. Further, the nozzles 103 may handle a wide range of material volume, and/or may deposit materials of very high-viscosity relative to conventional systems.

In some embodiments, the nozzles 103 may move together as a single unit with the print head. Further, supply of material to one or more of the nozzles 103 at various locations may be used to deposit the distinct materials precisely where each material is needed. Alternatively, one or more of the nozzles 103 may be moved separately from the others. In another embodiment, one nozzle 103 successively translocates in space to deposit different types of material in rapid succession, in order to successively build up a single heterogenous layer. In summary, the above processes may be characterized by continuous variation over time through one or multiple nozzles 103.

To aid in controlling the content of water and/or glycerol (or other solvent) in the extruded material, the energetic material nozzle may be heated to a higher temperature than that in the general environment of the center chamber 102. In some embodiments, the nozzle 103 may be heated to a temperature that is at least that of the boiling point of the solvent (such as glycerol and/or water) that is in the baseline propellant material, but is below a temperature at which the baseline propellant material decomposes. The decomposition may involve a heat-producing chemical reaction. This allows for removal of solvent material while still preserving the capability of the extruded material to function as a propellant (to later undergo the chemical reaction between the fuel and the oxidizer that produces propellant products such as pressurized gases). In addition, in some embodiments chemical reaction of the fuel and the oxidizer during the manufacturing process is undesirable in that it produces heat and combustion products, which can damage the manufacturing system. In some embodiments the nozzle 103 comprises an energetic material nozzle that may be heated by any of a variety of suitable mechanisms, many of which may be integrated into printer heads. For instance, the nozzle 103 may be electrically heated, with the electrical heating controlled by a suitable a feedback mechanism that controls the temperature of the nozzle. In some embodiments, temperature control of the pumpable propellant mixture allows initiation of cure, such as with the use of blocking/deblocking curative ingredients, and associated viscosities as deblocked or uninhibited curatives initiate chain extension of the polymeric resin binder at cure onset. This is one means of control for grain structures that require little or no cure oven conditioning time upon completion of the 3D print operation.

In some embodiments, successive fuel beads are applied continuously by at least one nozzle 103 for a predefined distance in the direction primarily parallel to the central axis. Further, the multi-grained fuel grains may be formed by printing successive layers of dissolvable core, the multi-grained fuel grain and the dissolvable core printed layer by layer. Dissolvable core components may comprise but are not limited to a variety of binders, adhesives, metallic binders, and the like. Further, the multi-grained fuel grain may be supported by a fuel grain support structure, the fuel grain support structure comprising solid propellant and having unique geometrically shaped bead layers. In addition, the multi-grained fuel grain may be supported by a fuel grain support structure, the fuel grain support structure comprising a solid catalyst, solid fuels, and the like. Notably, the multi-grained fuel grain have unique geometrically shaped bead layers that facilitate user control of rocket ballistics.

Notably, in some embodiments the temperature of mixing may be directly proportional to the viscosity of the baseline materials (also referred to herein as "slurry") and the thermal stability of the components used in the mixing system. The viscosity of the slurry determines the shear stress generated during compounding, which in turn determines how well various agglomerates are broken down and the individual particles are dispersed. Thus, in some embodiments it is advisable to use higher temperatures for slurries with a higher viscosity and lower temperatures for slurries with a low viscosity.

In other embodiments, the additive manufacturing process includes forming a shell around the sensors and the electrically-controlled solid propellant material. In some embodiments, the at least one nozzle is contained within a print head, wherein control algorithms are used to control the at least one nozzle in order to achieve desired deposition volumes and fuel grain forms. In other embodiments, forming the electrically-controlled second propellant material comprises forming the electrically-controlled second propellant material between adjacent pairs of sensors. In other embodiments, forming the sensors includes forming multiple adjacent pairs of sensors and forming electrically-controlled second propellant materials including material between the adjacent pairs of sensors.

In some embodiments, sensors are embedded into the fuel grain in order to facilitate continuous monitoring of the additive manufacturing process, the fuel grain including a plurality of layers of fuel grain material, each layer including a plurality of concentric circular structures of different diameter. Further, in some embodiments the sensors are embedded into the fuel grain in order to facilitate continuous modification of the additive manufacturing process. In some embodiments, at least one nozzle is contained within at least one print head. Notably, the at least one nozzle is adapted to extrude high viscosity fuels. Further, in some embodiments forming the sensors includes extruding electrically-conductive material, said sensors including a conductive polymer material; and wherein forming the electrically-controlled second propellant material includes extruding the electrically-controlled solid propellant material. Further, in some embodiments the electrically-conductive material is an electrically-conductive fill in a polymer.

In some embodiments, the present system is capable of printing with at least four to ten different materials. Further, the present system is capable of mixing heterogenous materials (i.e., various slurries and/or propellants) during the printing process. Said heterogenous materials may include unfilled thermoplastics and filled thermoplastics with natural fibers, carbon fibers, minerals, and/or metal particles having various shapes and aspect ratios. In some embodiments, continuous mixing via a robotic continuous mixer and continuous extrusion of a given material is contemplated. For example, in one embodiment a slurry material, or the like, may be continuously extruded into a given shape with a mandrel, effectively hybridizing the herein disclosed novel additive manufacturing technique with a more traditional "mix and pour-type" technique. This is permitted by use of a continuous mixer robot, various other robotics, and in-process continuous monitoring.

As described above, in some embodiments additive manufacturing of solid and/or hybrid rocket motors is accomplished using one or more print heads to deliver both inert and energetic materials. Notably, in some embodiments gas may become trapped in various voids during construction. As a consequence, one may utilize an inert shielding gas in order to enhance combustion. For example, carbon dioxide will contribute oxygen to the combustion reaction whereas argon, an inert noble gas, will not. Further to the above, in some embodiments a heavier-than-air inert or non-nanocomposite aluminum reactive gas may be utilized to cover a print bed and a nozzle of the additive manufacturing apparatus. In yet another embodiment, a 3 D printer may be configured such that the print bed is fully enclosed and sealed, and an inert non-heavier-than-air gas, such as nitrogen, infills the print bed chamber.

In some embodiments, continuous monitoring of the additive process is contemplated. Continuous monitoring may concern any step of the additive process, including the steps of post-cure inspection (i.e., x-ray), clean-up, and/or trimming steps. In some embodiments, the printing process is monitored by a logical controller, and a computer is used as an interface to enter the monitoring conditions (i.e., temperature, screw rotational speed, and material rate of deposition). In still other embodiments, monitoring and modification of the following are possible: fuel/oxidizer ratios, solids/binder ratios, mechanical properties, and/or thermoplastic/thermoset curable formulations. In yet another embodiment, the use of formulations including thermoplastic and passivated nanoscale metallic material permits continuous monitoring and modification during printing.

In one embodiment, continuous monitoring addresses the issue of maintaining the filament's diameter and roundness. Notably, a given filament's diameter and roundness often needs to be monitored with laser micrometers or other optical sensors so that the different processing parameters may be adjusted. In order to produce filaments with constant dimensions and roundness, a nozzle may be coupled with a conveyor belt that pulls away the filament, which is eventually spooled in a winding unit. Depending on the thermal conductivity of the filament, it may be necessary to cool down the filament by water or by air. Most highly-filled filaments have a high enough thermal conductivity that no water cooling is necessary. As a result, continuous monitoring may be utilized to monitor and modify all of such parameters in real-time. Such parameters may also include, for example, the extruder temperatures and rotational speed, the speed of the conveyor belt, and/or the spooling device.

As described above, the disclosed method of production includes a building platform capable of moving in multi-axis XYZ directions, controlled by step motors in order to modulate various factors, and further may permit a continuous horizontal printing pattern. By printing in a continuous printing pattern, the fuel grain production system can continuously print, thus reducing the total printing time. Notably, printing includes applying successive fuel layers continuously for a predefined distance in the direction primarily parallel to the central axis 115.

As described above, in some embodiments a unique method of operating a rocket permits modulation of the total impulse achieved. Said method of operation acts on a rocket with a rocket body wherein said rocket body comprises a cylindrical shell housing annular sections, said annular sections having spaces between said annular sections, wherein said spaces are filled with an electrically-operated propellant. Notably, the term "fuel grain" and "multi-grained fuel grain" is used interchangeably below, emphasizing the fact that in the preferred embodiment, multiple fuel grains may be mixed to permit stepwise control of rocket ballistics. Notably, the 3 D-printing of the associated rocket is monitored and modified in real-time via control algorithms that are used to control 3 D-printing to achieve desired deposition volumes. Said control algorithms include software and hardware systems in order to, in part, control the supply of high-viscosity raw materials during 3 D-printing. This rocket further includes a pre-ignition section and a post-ignition section, said post-ignition section disposed at the end of the rocket body opposing the payload section.

In addition, in some embodiments a propulsion system for a rocket is disclosed including rocket combustion components. Said combustion components may comprise oxidizers, rocket fuels, catalysts, and/or binders. Said propulsion system includes a fuel grain forming a fuel grain section, the fuel grain section contained in a rocket body. This fuel grain section has a generally cylindrical shape defining a center chamber, the center chamber having a substantially circular cross-section. This propulsion system also includes a payload section for storing incendiary fluid, said payload section located at a distal end of the rocket body. This propulsion system also includes a rocket body with annular sections, wherein said annular sections are embedded with sensors. Finally, this propulsion system also includes a flux controller for controlling the flux of incendiary fluid through an incendiary fluid channel. In some embodiments, said flux controller comprises a flux controller valve which blocks said incendiary fluid channel until solid propellant is substantially consumed. In some embodiments, the propulsion system may further include a gaseous flux control valve blocking means for maintaining a gaseous flux control valve in a closed position, said flux control valve blocking means being removable simultaneously with or after solid propellant is ignited.

In some embodiments, once the model is created and oriented, a preprocessing system then preferably divides the oriented fuel grain model into two-dimensional layers with defined footprint areas that increase with each subsequent two-dimensional layer until a width of the fuel grain model is achieved. The fuel grain production system receives the fuel grain model that is oriented in a direction of the central axis 115 and already divided into two-dimensional layers. The system then prints the fuel grain by applying at least one fuel layer in a direction primarily parallel to the central axis 115. Printing may include applying successive fuel layers continuously for a predefined distance in the direction primarily parallel to the central core axis 115. For example, printing may be accomplished by printing a first layer of the fuel grain in a continuous path filling the determined footprint area of the layer with propellant material and then printing successive layers in a similar manner.

In some embodiments, the herein disclosed rocket utilizes a fuel grain that comprises a plurality of layers of fuel grain material, each layer including a plurality of concentric circular structures of different diameter fused together to form a central opening therein. Notably, in the preferred embodiment the fuel grain material comprises an ignitable substance. In other embodiments, the plurality of layers are stacked and joined securely to form a cylindrical fuel grain with the central opening of each one of the plurality of layers aligned to form a combustion unit extending axially through the fuel grain and bounded by a combustion surface. In some embodiments, the combustion unit comprises a circular shape, an oval shape, an elliptical shape, a cylindrical shape, a polygonal shape, or an irregular shape. Notably, the above-discussed central chamber is formed at least in part by said plurality of layers.

In some embodiments, the fuel grain is configured to permit mixing of heterogenous materials to enhance thrust performance. In some embodiments, heterogenous materials comprise unfilled thermoplastics and/or filled thermoplastics, the unfilled thermoplastics and/or filled thermoplastics being filled with natural fibers, carbon fibers, minerals, and/or metal particles. Further, it is notable that heterogenous materials may comprise unfilled thermoplastics and/or filled thermoplastics with natural fibers, carbon fibers, minerals, metal particles, and heterogenous propellants. In some embodiments, the fuel grain has tailorable chemistries adaptable to continuous monitoring and/or continuous modification during the additive manufacturing process. In other embodiments, the fuel grain further comprises a thermally insulating material surrounding the fuel grain.

Figure 1B:
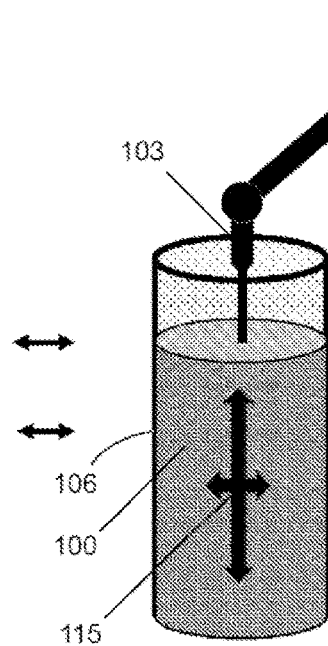
FIG. 1B depicts a fuel grain section with a generally cylindrical shape including a center chamber, nozzle and central axis according to an embodiment of the invention.
Figure 1C:
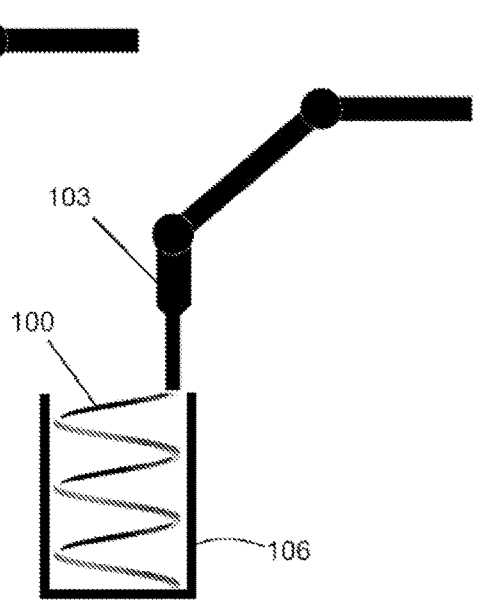
FIG. 1C depicts a fuel grain section with a generally cylindrical shape including a center chamber, nozzle, and helical deposition pattern according to an embodiment of the invention.

Regarding the printing process, the melted materials flow through the respective nozzles 103 per FIG. 1B and FIG. 1C. These nozzles 103 then extrude the melted materials along a primary axis 115 in a linear pattern. Continuous printing in such a pattern is not required, but does increase the speed of production. The specific pattern of printing allows for a continuous layer of material to be printed without stopping the print head thereby reducing printing time. In some embodiments, the present invention includes a method of making a fuel grain for a rocket, the method requiring in an additive manufacturing process. This process uses at least one nozzle to form a fuel grain that is composed of a first propellant and a void that facilitate variations in internal ballistics. Further sensors are formed during this process, the sensors permitting continuous monitoring and continuous modification during the 3 D-printing process such that a user may control the ballistics profile of the rocket motor. In other embodiments, electrically-controlled propellants come in contact with and operatively couple to the sensors, the additive manufacturing process using at least at least one nozzle to extrude raw materials.

Figure 2B:
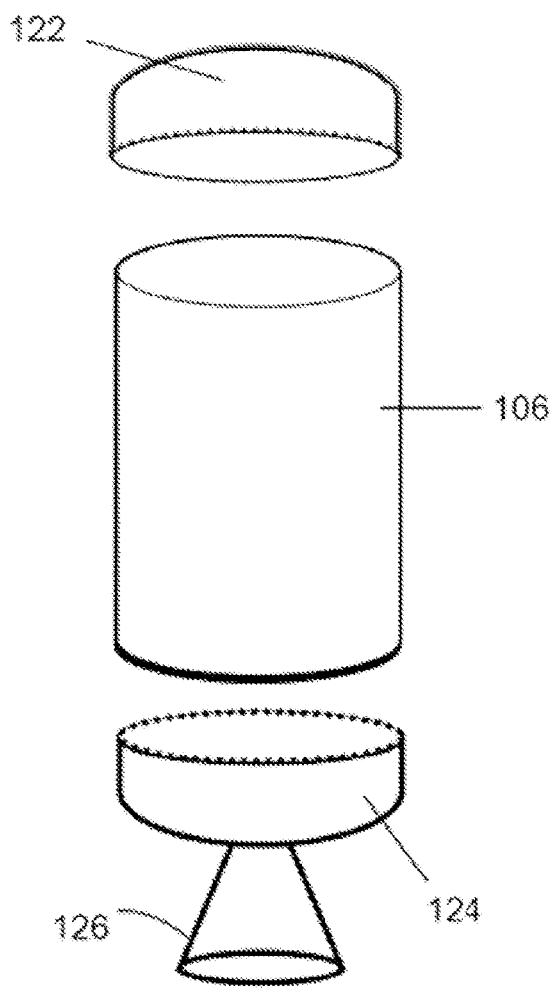
FIG. 2B depicts an exploded view of generally cylindrical rocket shape including a shell, a pre-ignition section, a post-ignition section, and a payload section.

FIG. 2A and FIG. 2B show an exemplary rocket motor incorporating the fuel grain 100 as described above. As depicted in FIG. 2B, the exemplary rocket includes a payload section 122 at one distal end of the rocket body 119, the body comprising a cylindrical shell 106 housing a series of annular sections 120. FIG. 2A depicts said annular sections 120 which, in one embodiment of the invention, may be embedded with sensors and various sensors. For illustration purposes there are spaces 118 between the annular sections 120, but in an actual device said spaces 118 may be filled with an electrically operated propellant or energetic gas-generating material. As depicted in FIG. 2B, the exemplary rocket also includes a pre-ignition section 124 and a post-ignition section 126 at the end of the rocket body opposing the payload section 122.

In some embodiments, continuous modification is directed to modification of fuel/oxidizer ratios, solids content, mechanical properties, and the like. In addition, in some embodiments a retardant layer may act to modify burning of an ignition channel. Further, in some embodiments a retardant layer may partially or completely inhibit burning of an ignition channel wall and/or reduce the rate of burning of an ignition channel wall.

In some embodiments, a first propellant has a slower burn rate than a second or third propellant. In other embodiments, the propellant material may be any of a variety of materials that burn to produce pressurized gases, and that is ignited by using the sensors in the preferred embodiment. One class of propellant materials are materials that produce an electrically activated (or electrically operated) solid propellant (also referred to herein as "electrically-activated propellant" or "EAP"). In some embodiments, rocket combustion components may comprise an oxidizer, a rocket fuel, and a binder. In some embodiments, the oxidizer may be a liquid- or solid-based perchlorate oxidizer that includes aluminum perchlorate, barium perchlorate, calcium perchlorate, lithium perchlorate, magnesium perchlorate, perchlorate acid, strontium perchlorate, and/or sodium perchlorate, singly or as eutectics or co-crystals with ingredients having positive oxygen balance. The rocket fuel may comprise a fuel grain (i.e., a solid propellant and solid fuel) and/or an incendiary fluid. Said fuel may be a metal-based or non-metal based fuel. Metal-based fuel may include, for example, tungsten, magnesium, copper oxide, copper, titanium, and/or aluminum. The binder may include casein, methyl cellulose, polyethylene oxide, polyvinyl acetate, and/or polyvinyl alcohol.

In other embodiments, the rocket fuel comprises a fuel grain section contained in a rocket body, said fuel grain section having a generally cylindrical shape defining the center chamber, the fuel grain section comprising a solid propellant and a solid fuel about said solid propellant. In some embodiments, the center chamber has a substantially circular cross-section but in other embodiments a star shape or irregular shape is possible. In still other embodiments, the rocket motor may run on liquid oxygen and liquid methane, which is an environmental improvement over the solid aluminum and/or ammonia used in many prior art launch assemblies. Use of the above fuels are not only 3 D-printable, they're scalable as well. As is described above, 3 D-printing reduces the need for special manufacturing of machine parts, cooling chambers, die casts, and the like.

In some embodiments, the flux controller blocks the flux of incendiary fluid until solid propellant is at least partially consumed. Thereafter, the flux controller allows said incendiary fluid to pass into a center chamber to react with solid fuel in a hybrid fuel reaction. Further, said rocket combustion components comprise an oxidizer, a rocket fuel, and a binder. In some embodiments, said oxidizer comprises a solid or liquid-based perchlorate oxidizer and the binder comprises casein, methyl cellulose, polyethylene oxide, polyvinyl acetate, and/or polyvinyl alcohol. Further, non-solid perchlorate oxidizer includes aluminum perchlorate, barium perchlorate, calcium perchlorate, lithium perchlorate, magnesium perchlorate, perchlorate acid, strontium perchlorate, and/or sodium perchlorate as important ingredients with additives creating eutectic mixtures, these being ionic liquid materials as an example. Further, said rocket fuel includes a cleaner-burning rocket fuel such as liquid oxygen and/or liquid methane. Further, the rocket fuel may include metal-based or non-metal based fuel. Further, the center chamber comprises unique patterns designed to induce oxidizer vortex flux persisting throughout the rocket's operation. Finally, in some embodiments a flux control valve provides a blocking means for maintaining said flux control valve in a closed position, said flux control valve blocking means being removable simultaneously with or after said solid propellant is ignited.

It should be noted that solid-fueled rocket motors in some cases possess characteristics which render them preferable to liquid-fueled engines, especially for military applications. For example, solid-fueled rocket motor do not require a complicated systems of valves, pumps, and tubing to move the propellant constituents from their storage tanks to the combustion chamber. Moreover, there is no requirement for the storage, transportation, and handling of great quantities of highly corrosive, toxic, and easily vaporized materials as with many liquid-fueled engines. In some embodiments, after each model is printed, it may be tested using technologies like ultrasound to ensure it is structurally sound.

However, liquid-fueled engines have some important advantages over the solid-fueled engines. In a solid propellant grain, the fuel particles and oxidizer are bound together as a single unit. Once the grain has been ignited, combustion continues until the entire grain is consumed. This makes it difficult to vary the total impulse of the rocket motor. Such devices as head-in reversal ports have not proven completely satisfactory in alleviating this problem. On the other hand, the flow of liquid propellant to the combustion chamber can be readily controlled by valves, variable pump speeds, and the like so that the overall total impulse of the engine can be varied. The flow of propellant can even be completely stopped and then restarted if desired. This characteristic of liquid-fueled engines permits propelling missiles varying distances. Thus, it is readily apparent that it would be very desirable to have a hybrid or solid-fueled rocket motor, such as that disclosed herein, that would permit a wider variation in total impulse, thus combining the advantages of both solid-fueled and liquid-fueled engine.

In some embodiments, a hybrid rocket engine ("engine" also referred to herein as "motor") permits unique operational advantages. As described herein, in some embodiments an oxidizer is introduced into the solid fuel grain 100 section along a pathway defined by a center chamber 102. Although, in the preferred embodiment, a fuel grain section may be manufactured in various sizes or dimensions, in an exemplary embodiment, the fuel grain section has an outer diameter of at least 6 inches. Although a fuel grain with any grain diameter can be fabricated, in some embodiments a ratio of about 5:1 (outer diameter to inner diameter) may be used for a hybrid rocket fuel grain.

In the preferred embodiment, the rocket motor further comprises an oxidizer source. As described above, the oxidizer source is for flowing through the combustion port during motor operation. As described above, a shell is further utilized for housing at least the fuel grain and the oxidizer source. Notably, the fuel grain composition is described in detail above, include details pertaining to its geometry, construction and its pyrophoric nature.

In some embodiments, the device may include an electrically controlled (also referred to herein as "electrically-operated") propellant and/or a comparable energetic material. Said propellant may be additively manufactured in conjunction with said sensors and/or sensors for producing a reaction in the material and/or for providing continuous monitoring and modification capabilities. The device may also include a shell 106 that is additively manufactured with the other components. The additive manufacturing may be accomplished by extruding or otherwise depositing raw materials for the different components where desired. The sensors may be made of a conductive polymer material, for example using an electrically conductive fill in a polymer. As described above, FIG. 2A shows annular sections 120 which may be embedded with said sensors and other sensors. The spaces 118 between annular sections may be filled with an electrically operated propellant in some embodiments.

In some embodiments, each structural layer may be formed by deposition of viscous polymers, forming a plurality of solidified adjoining structural spheres of material. In some embodiments, the viscosity of said viscous polymers are optimized and controlled such that operational yield stress is enhanced relative to prior art systems. As for the adjoining sphere structures, the objective is to increase the surface area presented to the flame zone for combustion (in some embodiments, within the center chamber 102) in a manner that is persistent throughout the hybrid rocket engine operation. In this exemplary embodiment, the surface pattern presented to the flame zone is characterized by a series of projections and depressions. According to other embodiments, the surface pattern may comprise a plurality of ribs, divots, knobs and/or recesses.

As described above, the viscosity of said viscous propellants and polymers are optimized and controlled such that operational yield stress is improved in a given system. Notably, the present invention is compatible with highly viscous materials, and is adaptable to perform across a wide range of viscosities. In the preferred embodiment, the present invention contemplates processing with viscosities that are higher than those described in prior art systems. This results in a substantial advantage relative to standard solid rocket preparation in that high viscosity propellants are now easily adaptable to be cast by the batch method, and other comparable methods. As described above, this advantage is largely related to grain size, but also to the unique processing features described above. In some embodiments, rocket motors are capable of being printed in their final high viscosity form (without substantial variance in viscosity throughout the curing process).

In one exemplary embodiment, each fused stacked layer is formed from a series of fused concentric circular spheres of solidified material featuring a pattern designed to increase the surface area of the combustion surface, as compared to a smooth construction. In one embodiment the center chamber 102 features unique patterns designed to induce oxidizer vortex flow persisting throughout the rocket motor's operation as the fuel is consumed. Notably, various surface features that create a heterogenous and/or elevated surface and increase the surface area of the center chamber 102 are contemplated by the present invention.

In some embodiments, the oxidizer may be an aqueous solution with the oxidizer material dissolved in water and/or glycerol. It has been found that controlling the amount of water and/or glycerol in the extruded material in an on-demand fashion facilitates additive manufacture of the propellant material. Too much solvent in the printed mixture can cause problems with curing the extruded material and having the extruded material properly maintain its shape. Too little solvent can result in problems with the material adhering to other material layers.

The raw propellant material that is used to additively manufacture the propellant material may have any of a variety of other suitable formulations. Broadly, the raw propellant material may include a fuel, a solvent (e.g., water and/or glycerol), an oxidizer, and a binder. The fuel and the oxidizer are the chemically active components that react with one another to produce the pressurized gases. The solvent receives the fuel and other components to allow mixing together of the components into a flowable material. The binder aids in maintaining the raw material as a unified material that can be cured and/or dried into a solid mass. Further to the above, regarding the oxidizer source, a liquid or gaseous oxidizer may be utilized. As described above, the oxidizer is for flowing through the combustion port during motor operation. However, in one embodiment of the present system, liquid or gaseous oxidizer may be stored adjacent to the motor section or even remotely on the vehicle. Regardless of the configuration or type of liquid or gaseous oxidizer used, the assembly of oxidizer tank, pressurizing system and associated plumbing is typically referred to as the oxidizer port. In some embodiments, the motor port and the oxidizer port are referred to collectively as a hybrid rocket engine system, sometimes also referred to as a hybrid rocket motor.

In some embodiments, a gaseous oxidizer is introduced into the fuel grain section of the center chamber through one or more infusion elements along a pathway defined by the center chamber causing a thin layer of the center chamber wall to phase change from solid to gas vapor. In some embodiments, using a thermoplastic fuel formulation such as 95% by mass Acrynotrile Butadiene Styrene (ABS) and 5% nanocomposite aluminum, phase change will occur from solid to gas vapor along the exposed surface area of the solid fuel grain center chamber wall. In some embodiments, the resulting combined fuel vapor and nanocomposite aluminum then mixes with the oxidizer to form a fuel/oxidizer mixture suitable for rocket engine combustion. The resulting combusted reaction mass is expelled at high temperature and pressure through the rocket engine's nozzle at a supersonic speed to generate thrust. In some embodiments, fuel formulations with a ratio in a range from about 75% (ABS)/25% (nanocomposite aluminum) up to about 95% (AB S)/5% (nanocomposite aluminum) are utilized.

In some embodiments, the present invention is independent of the particular propellant composition utilized in fabricating the grains, including the multi-grained fuel grains. Further, as described above a first propellant may comprise a propellant composition including a cured mixture of a polymeric binder, fuel particles, and an oxidizer in some embodiments. As polymeric binders, the polyurethanes, polydienes, polysulfides, polylactams, and the like are satisfactory. In other embodiments, double-base propellant compositions are utilized to satisfactory effect. In some embodiments, the propellant grain can contain no fuel components other than the binder. However, high energy fuels can, and normally will, be incorporated in the composition. Illustrative of these high energy fuels are powdered metal and metal hydrides as exemplified by aluminum, aluminum hydride, magnesium, lithium, lithium hydride, boron, and boron hydride and alloys of these metals. As an oxidizer, inorganic nitrates, chlorates, perchlorates, and the like such as ammonium perchlorates, ammonium nitrate, alkali and alkaline earth metal chlorates, perchlorates, and nitrates (e.g. sodium nitrate, potassium nitrate, potassium perchlorate) will normally be employed.

In the preferred embodiment, ammonium perchlorate composite propellant (APCP) is utilized as a first propellant. In other embodiments, an electrically-controlled second propellant is utilized. As is well-known in the art, ammonium perchlorate composite propellant is a composite propellant, meaning that it has both fuel and oxidizer mixed with a rubbery binder, all combined into a homogeneous mixture. In the preferred embodiment, APCP is cast or extruded into shape, as opposed to powder pressing as with black powder. This provides manufacturing regularity and repeatability, which are necessary requirements for use in the aerospace industry. In most embodiments, APCP propellant is composed of ammonium perchlorate, an elastomer binder such as hydroxyl-terminated polybutadiene or polybutadiene acrylic acid acrylonitrile prepolymer, powdered metal, and various burn rate catalysts. In other embodiments, curing additives induce elastomer binder cross-linking to solidify the propellant before use. In still other embodiments, perchlorate serves as the oxidizer, while the binder and aluminum serve as the fuel. In the preferred embodiment, burn rate catalysts determine how quickly the mixture burns. The resulting cured propellant is fairly elastic, which also helps limit fracturing during accumulated damage (such as shipping, installing, cutting) and high acceleration applications such as hobby or military rocketry.

In some embodiments, the composition of APCP can vary depending on the application, intended burn characteristics, and constraints such as nozzle thermal limitations or specific impulse. In some embodiments, rough mass proportions tend to be about 70/15/15 AP/HTPB/Al, though fairly high performance "low-smoke" can have compositions of roughly 80/18/2 AP/HTPB/Al. While metal fuel is not required in APCP, most embodiments include at least a few percent as a combustion stabilizer, propellant opacifier (to limit excessive infrared propellant preheating), and increase the temperature of the combustion gases (increasing Isp).

Notably, the possible combinations of solid propellant, liner, and oxidizer are extensive. For example, the layers of propellant can be of the polysulfide-perchlorate type as is described in the art. As is described above, a liner material may also be utilized, the liner comprising be polybutadiene couple with a perchloryl fluoride chlorine trifluoride oxidizer containing about 25 percent to about 50 percent by weight perchloryl fluoride. Polystyrene can also serve as a liner and fluorine as the oxidizer. These are but two specific examples of satisfactory combinations and are by no means limiting. Those skilled in the art are aware of the many organic polymers (practically all) which are hypergolic with the oxidizers mentioned hereinabove and will experience no difficulty in finding numerous satisfactory combinations of polymeric liners and hypergolic oxidizers within the framework and guidance of this disclosure.

In some embodiments, the invention contemplates a rigid or solid cast type form and in which the charge includes an encapsulated propellant sphere of liquid propellant in heterogenous distribution throughout a rigid matrix forming the solid charge. In addition, the invention may include the propellant charge as a combustible material having separate propellant spheres of fluid of different material disposed in a heterogenous distribution throughout a rigid matrix wherein each propellant sphere is separately encapsulated in a casing which is not reactive with the fluid and with the matrix at ambient conditions.

In some embodiments, the geometries of the fuel grain can be varied to achieve a desired thrust profile, in addition to (or alternatively) changing the porosity. In some embodiments, as shown in FIG. 2A, the center chamber 102 geometry directly relates to the intermediate wall structure and the fuel grain. These geometries generate a particular thrust profile that may be dictated by mission parameters or other performance specifications of the motor. Relatedly, in some embodiments, a variety of thrust profiles are generated which correspond to a given fuel grain geometry. It may be desirable to employ different thrust profiles in order to account for different mission parameters, such as burn duration, desired impulse, g-force sensitivity of onboard electronics or life-forms, or timing issues that demand different thrust at different times.

Variation in fuel transmission, created by variations in the size, distribution, and type of constituent passages, allow for the distribution of fuel throughout the center chamber 102, for example, in accordance with the expected fuel regression rate. Similarly, variation in pore size and fuel transmission enables the creation of fuel grain shapes, similar to those of traditional solid motors. Regression, or the amount of fuel consumed over a given amount of time at a given location along the inside of the center chamber 102, is related to the initial shape of the center chamber 102, the initial shape and distribution of fuel throughout the center chamber 102, the flow of fuel that is injected during the firing of the motor, and the chemical nature of the fuel(s) and oxidizer(s) used.

In some embodiments, a matrix of different geometries is utilized such that fuel grain motors are modified via a continuous variation capacity, independent of size. Further, as discussed above, the chemical nature of the fuels and oxidizers are of critical importance. The herein described invention contemplates related tailorable chemistries for such fuels and oxidizers. Notably, the present invention contemplates the entire range of the explosive process vs. the inert process. Finally, the printed in situ capabilities described above are such that the final product motor has customizable embedded sensors.

In some embodiments, the herein described invention may be adapted to wide variations in internal ballistics. In some embodiments, modelling may neglect or approximate processes of secondary importance such as flame propagation through various channel voids. Accordingly, the present disclosure provides different propellant grain configurations for achieving different desired performance characteristics.

In other embodiments, as described above, additive manufacturing is utilized to embed isolated formulations or structures in the propellant. Further, additive manufacturing is utilized to enhance combustion efficiencies or ballistics in a given system. In other embodiments, additive manufacturing is utilized to create motor designs on demand, without the use of molds or templated tooling elements.

In some embodiments, when used in military applications, additive manufacturing may be utilized to co-express propellant, explosives compositions, or the like, in order to enhance warhead effectiveness. In some embodiments, a room-temperature cure procedure is utilized wherein energetic formulations are cured at room temperature, thereby resulting in a stress-free motor interface across all anticipated propellant/insulation interfaces. Further, alternate design features are contemplated wherein a variety of room temperatures are utilized. The above uses of additive manufacturing also generally benefit from minimized nucleation and minimized fissure creation during storage and/or operation. As a consequence, a reduced incidence of catastrophic failure is experienced.

In addition, there are a number of other additive manufacturing methods that can be employed to produce solid and/or hybrid rocket fuel grains according to the present invention and using a formulation of slurry material such as a polymer and/or nanocomposite additive, without departing from the spirit and scope of the present invention, including but not limited to: Stereolithography, Selective Laser Sintering, Powder Bed Printing, and Inkjet Head Printing. For the example, a composition of the fuel grain may comprise about 95% by mass Acrylonitrile Butadiene Styrene (ABS), a thermoplastic possessing combustion characteristics desirable for hybrid rocket engine fuel, and about 5% nanocomposite aluminum. Fuel having this structure is available from several sources, as known by those skilled in the art. With a Young's Modulus of 2.0-2.6 GPa, ABS is 460 times less elastic than HTPB and 38 times less elastic than paraffin wax, making it an ideal material for fabricating a hybrid rocket fuel grain and the center chamber 102 of the combustion chamber.

In some embodiments of the present invention, a particular method of making a fuel grain for use in a rocket motor is contemplated. In the preferred embodiment, said method permits continuous monitoring, continuous mixing, and continuous modification of the slurry layers by way of multiple nozzles. In some embodiments, the method of making a fuel grain includes compounding a first material suitable as a hybrid rocket propellant, a second energetic material, and a third ignitable material according to a predetermined mixture ratio in order to form a fourth material. Notably, in some embodiments this fourth material may serve as a raw material for use in an additive manufacturing device. In other embodiments, this proprietary method involves operating the additive manufacturing device using the above-mentioned raw material to fabricate a solidified fuel grain comprising a plurality of stacked layers. As described above, the stacked layers may be joined securely and combined into a plurality of stacked layers, the plurality of stacked layers forming a cylindrical fuel grain. Further, the plurality of layers may be aligned to form a combustion unit extending axially through the fuel grain and bounded by a combustion surface. In other words, the plurality of layers may form a central chamber as described above. Notably, the above-described fuel grain may be configured to permit mixing of heterogenous propellants in order to enhance thrust performance.

Generally, energetic materials suitable for use in the present invention are a class of material with high concentrations of stored chemical energy that may be released. Highly energetic materials include, for example, ultrafine aluminum powder, the particle size of which may vary from micron to nanoscale, including particles that are a composite of aluminum and polymer in nanoscale. As known by those skilled in the art, generally a nanocomposite is a material comprising two or more constituent solids, the size of which measures 100 nanometers (nm) or less. Even though the nano-scale aluminum particle cores are completely encapsulated in a polymer based oligomer coating and thus passivated, there remains the possibility that this highly energetic pyrophoric material can still be reactive with oxygen or water vapor.

In one application, the compounded material is stored within a climate controlled environment. As a further safety measure, in some embodiments after fabrication each fuel grain or fuel grain section may be shrink-wrapped to encase the fuel grain or fuel grain section in a thin plastic film to prevent atmospheric exposure prior to its use in a rocket engine. In another embodiment the fuel grain is spray coated with a polymeric material or paint that serves to prevent atmospheric exposure. According to another embodiment the fuel grain or grain segment is inserted into an air-tight packaging cylinder and a vacuum drawn to remove all air. The packaging cylinder is sealed before it is removed from the print bed chamber.

Exemplary constructions of the solid and/or hybrid rocket fuel grains are engineered to both increase the amount of surface area available for combustion as a means to improve regression rate, to improve specific impulse, to generate an oxidizer vortex flow, and to reduce fuel waste by inducing oxidizer axial flow within the center chamber 102 to allow more time for oxidizer and fuel gases (or oxidizer and entrained liquid droplets) to mix and combust more thoroughly. Any surface area pattern or topology that furthers one or more of these objectives, and is sustainable throughout the fuel grain cross-section (i.e., as one fuel grain layer ablates the next fuel gran layer presents a desirable surface area pattern) is considered within the scope of the present invention.

As described above, as shown in FIG. 1A and FIG. 2A, the fuel grain section has a generally cylindrical shape and defines a center chamber 102. As depicted in FIG. 2A, the solid fuel grain 100 section is formed via continuous modification forming a stack of layers with each such layer formed as a series of abutting and/or interwoven surfaces of solidified material arrayed around the center chamber 102. In one embodiment, a heat gun is used to bond the individual layers. As is known by those skilled in the art, other adhesives may be used to join the grain section.

In some embodiments, the present invention may include an electrically-operated propellant or energetic gas-generating material, additively manufactured together with sensors for producing a reaction in the material. As depicted in FIG. 2A and FIG. 2B, the device may also include a shell 106 that is additively manufactured with the other components. The additive manufacturing process may be accomplished by extruding or otherwise depositing raw materials for the different components where desired. The sensors may be made of a conductive polymer material, for example using an electrically-conductive fill in a polymer. Regarding electrically operated propellants, in the preferred embodiment an electrically operated propellant ignites with the application of electricity (from the sensors) and correspondingly extinguishes with the cessation of electricity, even when exposed to high pressures, though below a high pressure threshold. For example, when exposed to ambient or high pressures within the shell, such as atmospheric pressure, pressures greater than 200 psi, 500 psi, 1000 psi, 1500 psi and up to 2000 psi, the electrically operated propellant is extinguished with the interruption of electricity (e.g., voltage or current) applied across the electrically operated propellant. In other words, without application of electricity, the combustion of the electrically operated propellant is not self-sustaining at high pressures, such as high pressures of 200 psi or more and less than 2000 psi. Thus, the electrically operated propellant is configured for "on" and "off" operation under the described variety of conditions.

Notably, the sensors may also be made of any of a variety of electrically conductive materials. One suitable material may be a conductive polymer material. This may be a polymer material that includes a conductive material fill, such as electrically-conductive powder or electrically-conductive fibers. The fill material may include carbon and/or graphene powders or fibers. Other possible fill materials may be metal powders or other electrically conductive materials, preferably with a melting point that is greater than an extrusion temperature.

The conductive material may also be an extrudable or solid metal, for example copper wire surrounded by a plastic sheath. The material is passed through heated nozzles 103 (or other dispensers), which melts the plastic sheath, while leaving the metal in solid form. Cut bits of metal may come into electrical conduct with one another, to allow the sensors to be produced using this process. Various numbers and placement of sensors are possible. For example, the sensor arrangement may include sensors in concentric circles, parallel plates, or a grid-like array of plates. Whatever the arrangement of the sensors, there may be electrical leads between the sensors and a power source, such as a battery, that is used for providing power to active the propellant material. The electrical power source may be coupled to a suitable control system for providing electrical power to the sensors when burning of the propellant or energetic material is desired.

Further to the above, in some embodiments additive manufacturing is utilized to embed electrical conductors in the propellant so as to reduce ESD hazards. In other embodiments, embedded electrochemical sensors are used to indicate relative stabilizer depletion and/or related health monitoring metrics. Further, in some embodiments embedded pressure sensors are utilized to measure internal off-gassing, internal swelling, pressure buildup, and the like. Monitoring these elements enhances one's ability to monitor age-out indicators and other important indicators of device health. In still other embodiments, additive manufacturing is utilized to embed actuators, such as piezoelectric devices, in various locations around the device. Notably, as described above, one may also modify fuel grain configurations during a mission in order to modulate thrust characteristics during flight. In some embodiments, embedded actuators may be crucial to monitoring the health of these systems.

Relatedly, in some embodiments different controllers and/or control algorithms may be used to control the different nozzles 103, in order to achieve the desired deposition volume and form in various configurations. For instance, software and/or firmware for controlling the movement of the nozzles 103, and for controlling the supply of various raw materials to the nozzles 103, may be configured with software and/or firmware that takes into account the differences in operation of different of the nozzles 103.

In some embodiments, software and/or firmware may include a plugin framework that may support integrating third party algorithms and software for sensor simulation, vehicle models, etc. In some embodiments, the plugins may communicate with each other through a subscription paradigm carried out, for instance, using the Data Distribution Services (DDS) standard. This may enable third party engineers to quickly contribute new functionality through the plugin model including, e.g., rocket control algorithms.

Further, in some embodiments additive manufacturing is utilized to control software and sensor networks which consequently permit operators to vary the characteristics of the end-use product. Multiple variables may be controlled by the user including: inert materials placement, cure rate, design configuration, ballistics, explosive yield, and other structural properties. As described above, monitoring and control of these variables allows for varied thrust profiles. Catalysts may also be utilized to induce a quick cure. Finally, this process is facilitated by the mixing of elements described above in addition to use of the correct viscosity.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

Although the invention has been shown and described with respect to a certain preferred embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any particular application.

What is claimed is:

1. A propulsion system for a rocket, comprising:
rocket combustion components;
a multi-grained fuel grain forming a fuel grain section, the fuel grain section contained in a rocket body, said fuel grain section having a generally cylindrical shape defining a center chamber, the center chamber having a substantially circular cross-section;
a payload section, said payload section located at a distal end of the rocket body;
said rocket body further comprising at least one annular section, wherein said at least one annular section is embedded with sensors;
wherein said sensors provide continuous monitoring and continuous modification such that a user controls the ballistics profile of a rocket motor;
wherein electrically-controlled propellants come in contact with and operatively couple to the sensors;
wherein said sensors comprise an electrically conductive fill in a polymer;
wherein said sensors are used to indicate relative stabilizer depletion and to measure internal off-gassing; and
wherein said at least one annular section is formed via additive manufacturing by applying successive fuel beads for a predefined distance and time.

2. The propulsion system of claim 1, wherein successive fuel beads are applied continuously for a predefined distance in the direction primarily parallel to the central axis.

3. The propulsion system of claim 1, wherein the at least one annular section comprises a multi-grained fuel grain, the multi-grained fuel grain printed by fuel beading, the multi-grained fuel grain further formed by printing successive layers of dissolvable core, the multi-grained fuel grain and the dissolvable core printed layer by layer.

4. The propulsion system of claim 1, wherein said rocket combustion components comprise at least one oxidizer, at least one rocket fuel, at least one catalyst, and a binder.

5. The propulsion system of claim 4, wherein the binder comprises casein, methyl cellulose, polyethylene oxide, polyvinyl acetate, hydroxy-functional prepolymers of polybutadiene, and/or polyvinyl alcohol.

6. The propulsion system of claim 3, wherein the multi-grained fuel grain may be supported by a fuel grain support structure, the fuel grain support structure comprising solid propellant and having unique geometrically shaped bead layers.

7. The propulsion system of claim 3, wherein the multi-grained fuel grain may be supported by a fuel grain support structure, the fuel grain support structure comprising a solid catalyst and having unique geometrically shaped bead layers.

8. The propulsion system of claim 4, wherein said rocket fuel may comprise a metal-based fuel, polybutadiene acrylic acid acrylonitrile prepolymer, and a perchlorate oxidizer.

* * * * *